US009689409B2

(12) United States Patent
Cannata

(10) Patent No.: US 9,689,409 B2
(45) Date of Patent: Jun. 27, 2017

(54) PASSIVE PISTON HYDRAULIC DEVICE WITH PARTITION

(71) Applicant: Tonand Brakes Inc., London (CA)

(72) Inventor: Antonio Cannata, London (CA)

(73) Assignee: Tonand Brakes Inc., London (CA)

( * ) Notice: Subject to any disclaimer, the term of this patent is extended or adjusted under 35 U.S.C. 154(b) by 331 days.

(21) Appl. No.: 14/255,439

(22) Filed: Apr. 17, 2014

(65) Prior Publication Data

US 2015/0300383 A1 Oct. 22, 2015

(51) Int. Cl.

| | |
|---|---|
| ***F16D 31/02*** | (2006.01) |
| ***F15B 15/14*** | (2006.01) |
| ***F15B 13/02*** | (2006.01) |
| ***F04B 5/02*** | (2006.01) |

(52) U.S. Cl.

CPC .............. *F15B 15/149* (2013.01); *F04B 5/02* (2013.01); *F15B 13/021* (2013.01); *F15B 13/022* (2013.01); *F15B 15/1447* (2013.01); *F15B 15/1457* (2013.01); *F15B 2211/205* (2013.01); *F15B 2211/7053* (2013.01)

(58) Field of Classification Search

CPC ........ F03C 4/00; F04B 3/00; F04B 111/0016; F04B 49/16

USPC .................................................... 60/371, 417

See application file for complete search history.

(56) References Cited

U.S. PATENT DOCUMENTS

2012/0137667 A1* 6/2012 Jacobsen .................. B60K 6/12 60/327
2012/0260794 A1* 10/2012 Cannata .................... F15B 1/04 91/189 R

* cited by examiner

*Primary Examiner* — Thomas E Lazo
*Assistant Examiner* — Daniel Collins
(74) *Attorney, Agent, or Firm* — Grant Tisdall; Gowling WLG (Canada) LLP

(57) ABSTRACT

A hydraulic device having: a housing; a bore of the housing having a first piston positioned therein for a first reciprocal motion within the bore along a bore axis; a mechanical element coupled to the first piston for either driving the first reciprocal motion or being driven by the first reciprocal motion; a second piston positioned in the bore for a second reciprocal motion within the bore along the bore axis; a hydraulic fluid chamber of the bore positioned between the first piston and the second piston, the hydraulic fluid chamber having a hydraulic fluid inlet and a hydraulic fluid outlet; a chamber of the bore positioned between the second piston and a wall of the housing, the chamber for having a resilient element therein; a separator partition dividing the hydraulic fluid chamber into a first hydraulic fluid chamber and a second hydraulic fluid chamber, the separator partition positioned in the bore between the hydraulic fluid inlet and the second piston, the separator partition having a first fluid passageway for fluidly coupling the first hydraulic fluid chamber with the second hydraulic fluid chamber; and a valve for controlling flow in the first fluid passageway of hydraulic fluid between the first hydraulic fluid chamber and the second hydraulic fluid chamber.

21 Claims, 14 Drawing Sheets

PASSIVE PISTON HYDRAULIC DEVICE WITH PARTITION

FIELD OF THE INVENTION

The present disclosure relates to the field of hydraulic piston operated devices, and in particular the pistons used in such devices.

BACKGROUND

Current hydraulic devices can suffer from operational efficiencies due to the required movement of their piston(s) as a result of inlet/outlet fluid pressures to the device and influence of a drive mechanical component or driven mechanical component operatively coupled to one or more of the piston(s). In particular, current hydraulic devices only provide for coupled movement of multiple piston arrangements, such that the movement of the pistons is done at the same time due to influence of the hydraulic fluid movement and/or the mechanical component(s).

SUMMARY

There is a need for a hydraulic device that provides improved hydraulic performance.

In one embodiment, provided is a hydraulic device having: a housing; a bore of the housing having a first piston positioned therein for a first reciprocal motion within the bore along a bore axis; a mechanical element coupled to the first piston for either driving the first reciprocal motion or being driven by the first reciprocal motion; a second piston positioned in the bore for a second reciprocal motion within the bore along the bore axis; a hydraulic fluid chamber of the bore positioned between the first piston and the second piston, the hydraulic fluid chamber having a hydraulic fluid inlet and a hydraulic fluid outlet; a chamber of the bore positioned between the second piston and a wall of the housing, the chamber for having a resilient element therein; a separator partition dividing the hydraulic fluid chamber into a first hydraulic fluid chamber and a second hydraulic fluid chamber, the separator partition positioned in the bore between the hydraulic fluid inlet and the second piston, the separator partition having a first fluid passageway for fluidly coupling the first hydraulic fluid chamber with the second hydraulic fluid chamber; and a valve for controlling flow in the first fluid passageway of hydraulic fluid between the first hydraulic fluid chamber and the second hydraulic fluid chamber.

BRIEF DESCRIPTION OF THE DRAWINGS

The present invention will now be described in further detail with reference to the following figures, by way of example.

DETAILED DESCRIPTION

The following relates to a hydraulic device for use as a hydraulic pump and/or a hydraulic motor configured as a piston type device (e.g. reciprocating type device). Examples of hydraulic systems incorporating such pump/motors can include, but are not limited to, a brake system, a drive system, etc.

Figure 1:
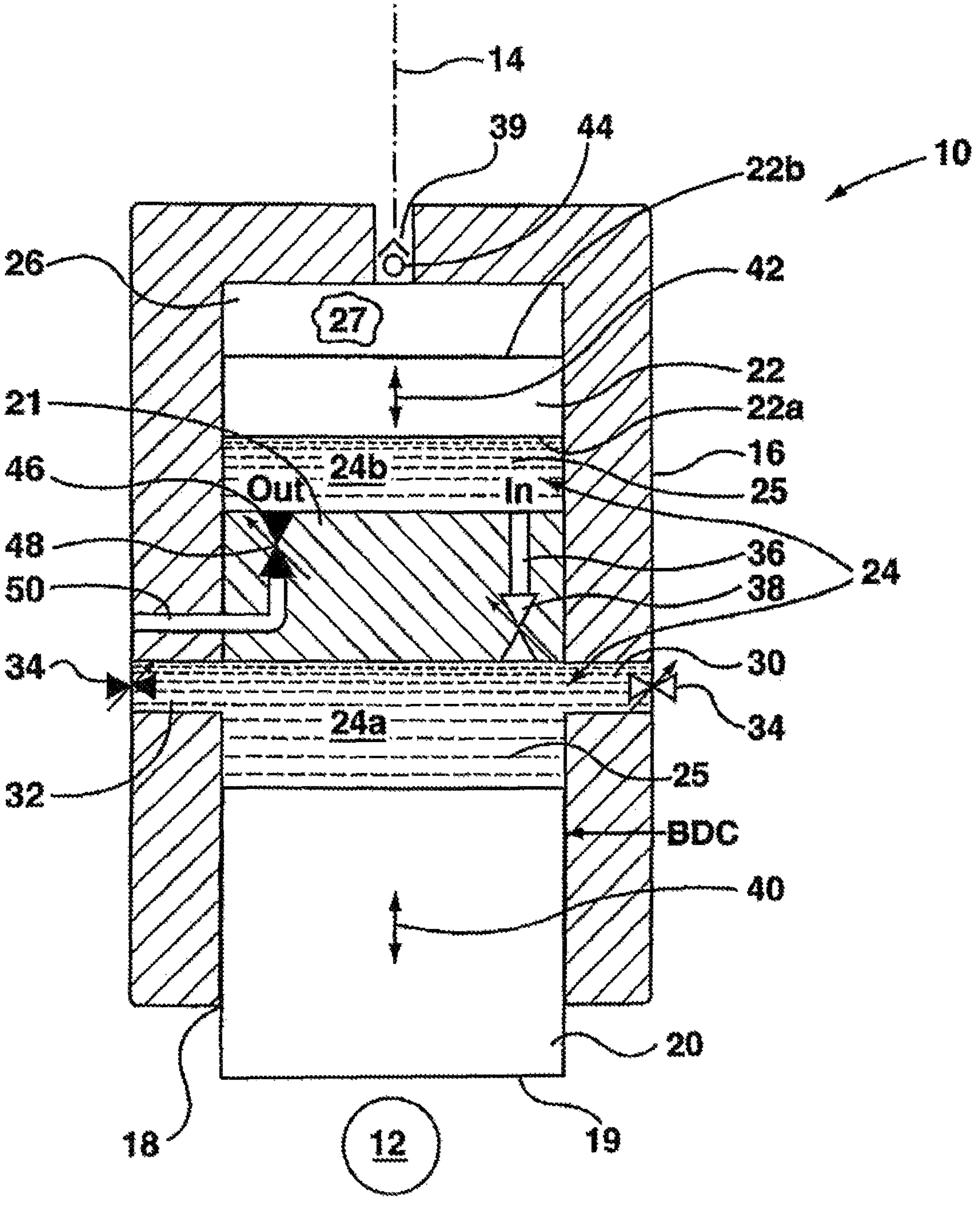
FIG. 1 is a cross sectional side view of a hydraulic device.

An example hydraulic device is shown in FIG. 1 and is indicated generally at numeral 10. The hydraulic device 10 can be coupled to a mechanical element 12 (e.g. one end of a connecting rod connected a common driveshaft—not shown) for either driving reciprocal motion (when operated as a hydraulic motor) of a first piston 20 or being driven (when operated as a hydraulic pump) by the reciprocal motion. For example, when in brake mode, the rotational motion of the driveshaft is transferred to reciprocating motion 40 of the first piston 20 via the mechanical element 12 (e.g. connecting rod). When in drive mode, the reciprocating motion 40 of the first piston 20 can be transferred to rotational motion of the driveshaft via the mechanical element 12 (e.g. connecting rod).

In alternative, the first piston 20 (or driver/driven piston) can include a surface 19 that is shaped to receive a bearing mechanism that provides for the transfer of power between the mechanical element 12 (e.g. connecting rod) and the first piston 20 and that allows for the first piston 20 to decouple from the mechanical element 12 (e.g. connecting rod). For example, the mechanical element 12 can be a cam surface in contact with the first piston 20, such that the cam surface can decouple from the surface 19 of the first piston 20 during selected portions of the intake and exhaust cycle of the hydraulic device 10.

The hydraulic device 10 includes a main body or housing 16. Within the housing 16, the hydraulic device 10 includes the first piston 20 and a second piston 22 that define a hydraulic fluid chamber 24 between them, separated into a first hydraulic chamber **24*a* and a second hydraulic chamber 24*b* by a separator partition 21, as further described below. A bore 18 of the housing 16 receives the first piston 20 therein for a first reciprocal motion 40 within the bore 18 along a bore axis 14. The bore 18 also receives the second piston 22 therein for a second reciprocal motion 42 within the bore 18 along the bore axis 14, such that the first reciprocal motion 40 and the second reciprocal motion 42** can be decoupled from one another as further described below.

For example, the first reciprocal motion 40 and the second reciprocal motion 42 can be configured for acting in both a same direction and an opposite direction along the bore axis 14 during respective portion(s) of an intake and exhaust cycle of the hydraulic device 10.

It is noted that hydraulic fluid 25 can be at the same or different fluid pressures in the different hydraulic chambers 24*a,b*, depending upon hydraulic fluid 25 communication between the hydraulic chambers 24*a,b*, as discussed. Also, located between the second piston 22 and a wall of the housing 16 is a resilient chamber 26 for containing a resilient element 27 (e.g. compressible fluid such as air). As such, reciprocation 42 of the second piston 22 along the bore axis 14 is dictated by a resulting force differential between the hydraulic fluid 25 (in the second hydraulic chamber 24*b*) acting on a first face 22*a* of the second piston 22 and the resilient element 27 (in the resilient chamber 26) acting on the second face 22*b*. For example, it is understood in the case where the resilient element 27 is air, the direction of the reciprocal motion 42 will be dependent upon which of the resilient element 27 or the hydraulic fluid 25 has the greater pressure (e.g. pressure of hydraulic fluid 25 greater than pressure of resilient element 27 would result in motion of the second piston 22 away from the separator partition 21, pressure of hydraulic fluid 25 less than pressure of resilient element 27 would result in motion of the second piston 22 towards the separator partition 21, pressure of hydraulic fluid 25 equal to pressure of resilient element 27 would result in a stationary position of the second piston 22 with respect to the separator partition 21). As such, the second piston 22 can be referred to as a passive or floating piston and the first piston 20 can be referred to as an active or main piston, as the second piston 22 is not connected (e.g. is unconnected) to any mechanical drive elements (as is the first piston 20).

Referring again to FIG. 1, the hydraulic device 10, the hydraulic fluid chamber 24 of the bore 18 is positioned between the first piston 20 and the second piston 22, the hydraulic fluid chamber 24 having a hydraulic fluid inlet 30 for providing access of the hydraulic fluid 25 into the first hydraulic chamber 24*a* and a hydraulic fluid outlet 32 for providing egress of the hydraulic fluid 25 out of the first hydraulic chamber 24*a*. For example, the hydraulic fluid outlet 32 can be located in the wall of the housing 16 between the separator partition 21 and the first piston 20. Ingress and egress of the hydraulic fluid 25 with respect to the first hydraulic chamber 24*a* can be controlled by one or more valves 34. Also provided is the separator partition 21 dividing the hydraulic fluid chamber 24 into the first hydraulic fluid chamber 24*a* and the second hydraulic fluid chamber 24*b*, such that the separator partition 21 is positioned in the bore 18 between the hydraulic fluid inlet 30 and the second piston 22. The separator partition 21 has a first fluid passageway 36 for fluidly coupling the first hydraulic fluid chamber 24*a* with the second hydraulic fluid chamber 24*b* and a valve 38 for controlling flow in the first fluid passageway 36 of hydraulic fluid 25 between the first hydraulic fluid chamber 24*a* and the second hydraulic fluid chamber 24*b*.

The housing 16 can also have an optional passageway 39 (in the case where the resilient element 27 is a compressible fluid such as air), which can provide for an amount of the resilient element 27 to pass into and/or out of the resilient chamber 26 (e.g. controlled via valve 44). It is recognised that the resilient chamber 26 can have a fixed amount of the resilient element 27 deposited therein and/or can have a variable amount of the resilient element 27 deposited therein as controlled via a resilient element supply (e.g. air supply—not shown) in combination with the control valve 44. For example, controlled variation in the amount of the resilient element 27 contained in the resilient chamber 26 can be used to affect the rate and/or direction of the reciprocal motion 42 of the second piston 22, as desired.

The resilient element 27 can be any element that is operable to convert kinetic energy to potential energy and vice versa. Examples of resilient elements 27 that can be used include a spring. The resilient element 27 can be a compressible medium such as an air bag or a gas, such as nitrogen, that will then be contained within the closed resilient chamber 26 (e.g. container). For example, the passageway/opening 39 can be closed (via valve 44) to contain the resilient element 27 within the second cavity 26. For example, the resilient element 27 can be connected to an external resistance control element, not shown, such as, for example, a source of compressed air, that can adjust the amount of the resilient element 27 in the resilient chamber 26 in order to affect the movement of the second piston 22.

Figure 2:
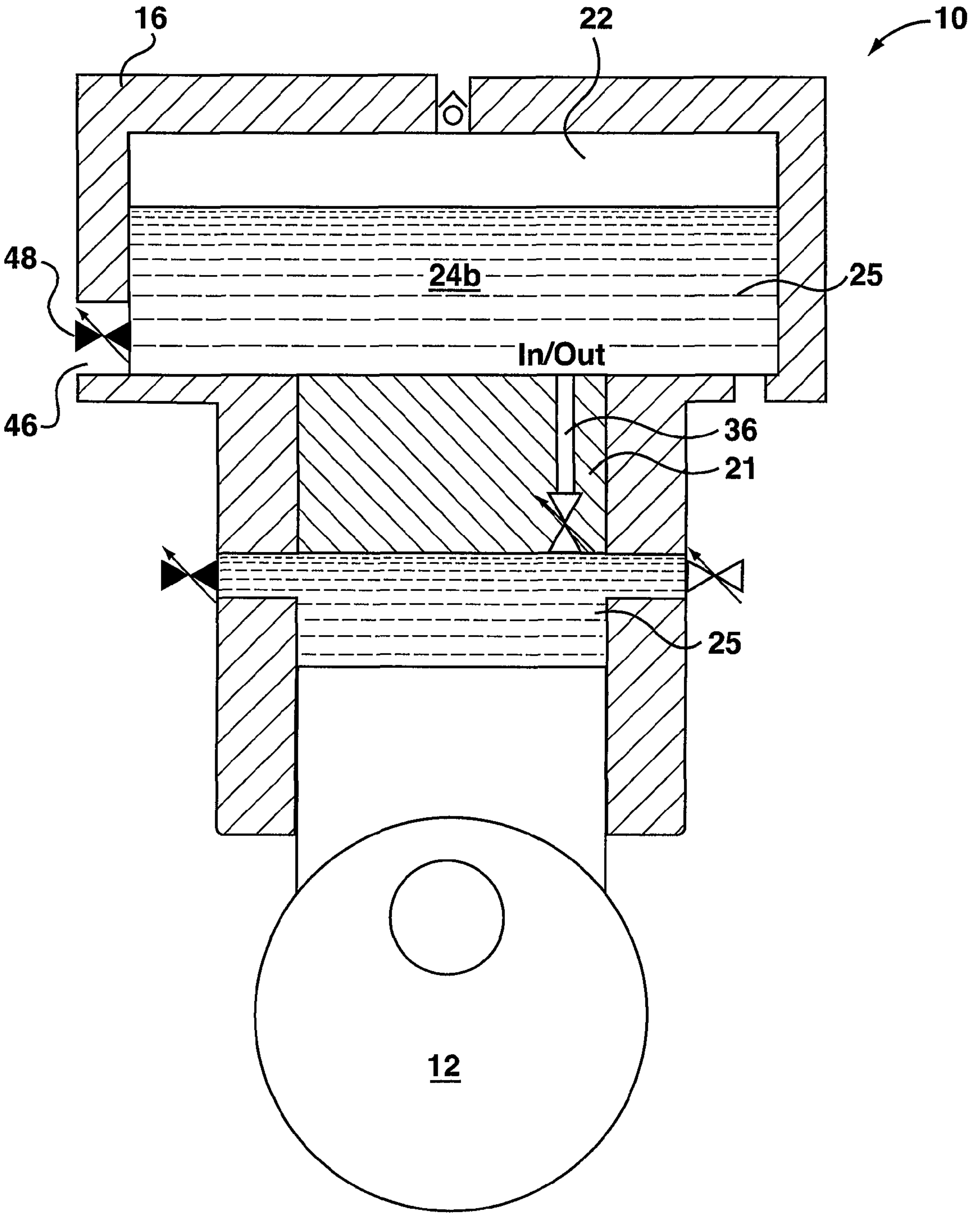
FIG. 2 is an alternative embodiment of the hydraulic device of FIG. 1.

Referring again to FIG. 1, the hydraulic device 10 can also have a second hydraulic fluid outlet 46 for exhausting hydraulic fluid 25 out of the second hydraulic chamber 24*b*, such that the second hydraulic fluid outlet 46 is separate from the first hydraulic fluid outlet 32 (e.g. controlled via second control valve 48). As shown in FIG. 1, the second hydraulic fluid outlet 46 can be connected to a second fluid passageway 50 in the separator partition 21. In an alternative embodiment, as shown in FIG. 2, the second hydraulic fluid outlet 46 can be positioned in a wall of the housing 16 and as such is independent from the separator partition 21. It is recognised that in both embodiments shown in FIGS. 1 and 2, the hydraulic fluid outlet 46 provides for the exhausting of the hydraulic fluid 25 from the second hydraulic fluid chamber 24*b* and out of the bore 18.

Figure 3:
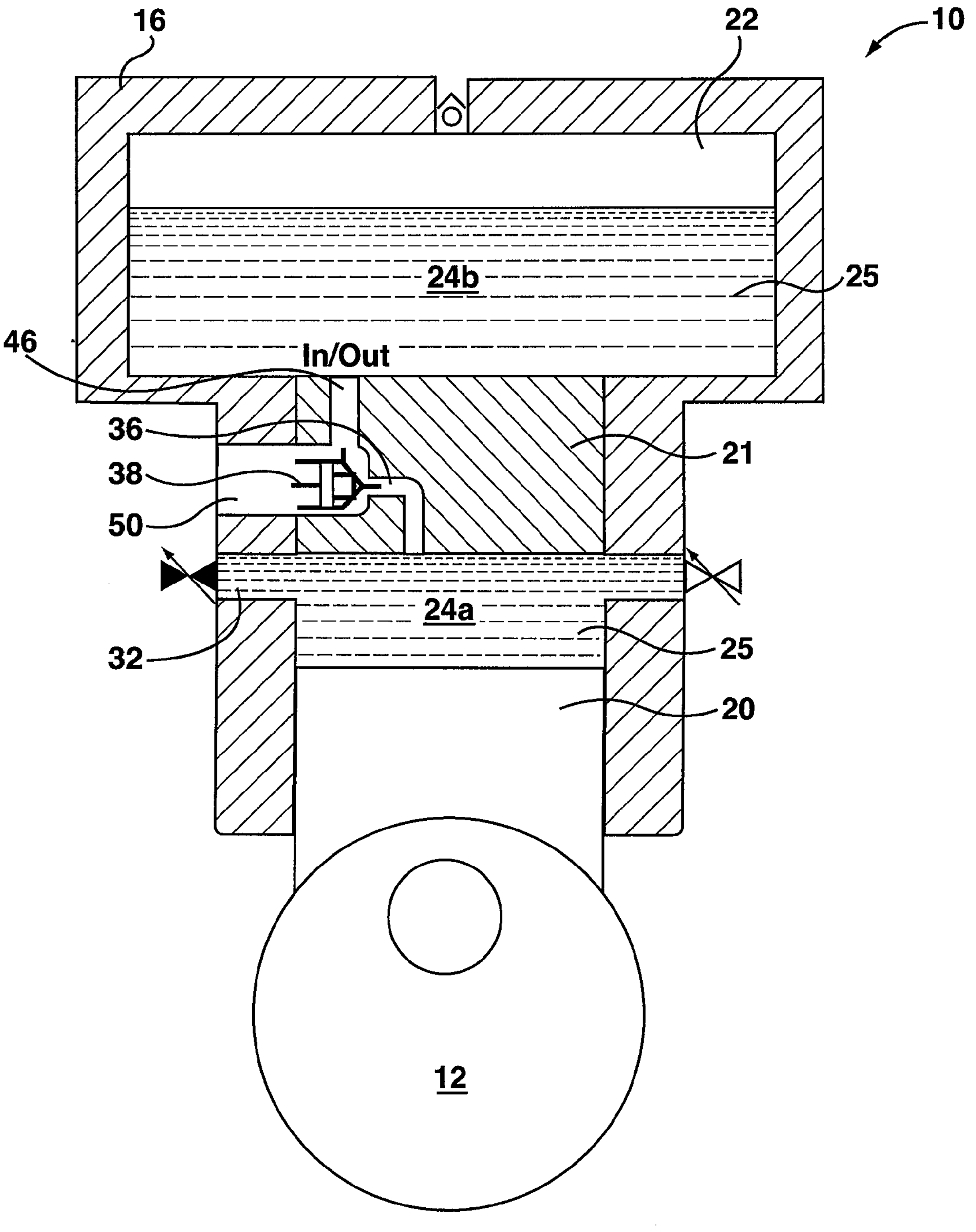
FIG. 3 is an alternative embodiment of the hydraulic device of FIG. 1.

In a further alternative embodiment, as shown in FIG. 3, the second hydraulic fluid outlet 46 can be connected to the fluid passageway 36 in the separator partition 21, such that the fluid passageway 36 provides for both ingress and egress of the hydraulic fluid 25 into and out of the second hydraulic fluid chamber 24*b*, as controlled via the (e.g. multi-position) control valve 48. In this embodiment, via the control valve 48, there is the option of exhausting the hydraulic fluid 25 out of the second hydraulic chamber 24*b* and out of the bore 18 via second fluid passageway 50, and/or exhausting the hydraulic fluid 25 out of the second hydraulic chamber 24*b* and into the first hydraulic chamber 24*a* via fluid passageway 36 for subsequent egress out of the bore 18 via hydraulic fluid outlet 32.

Figure 4:
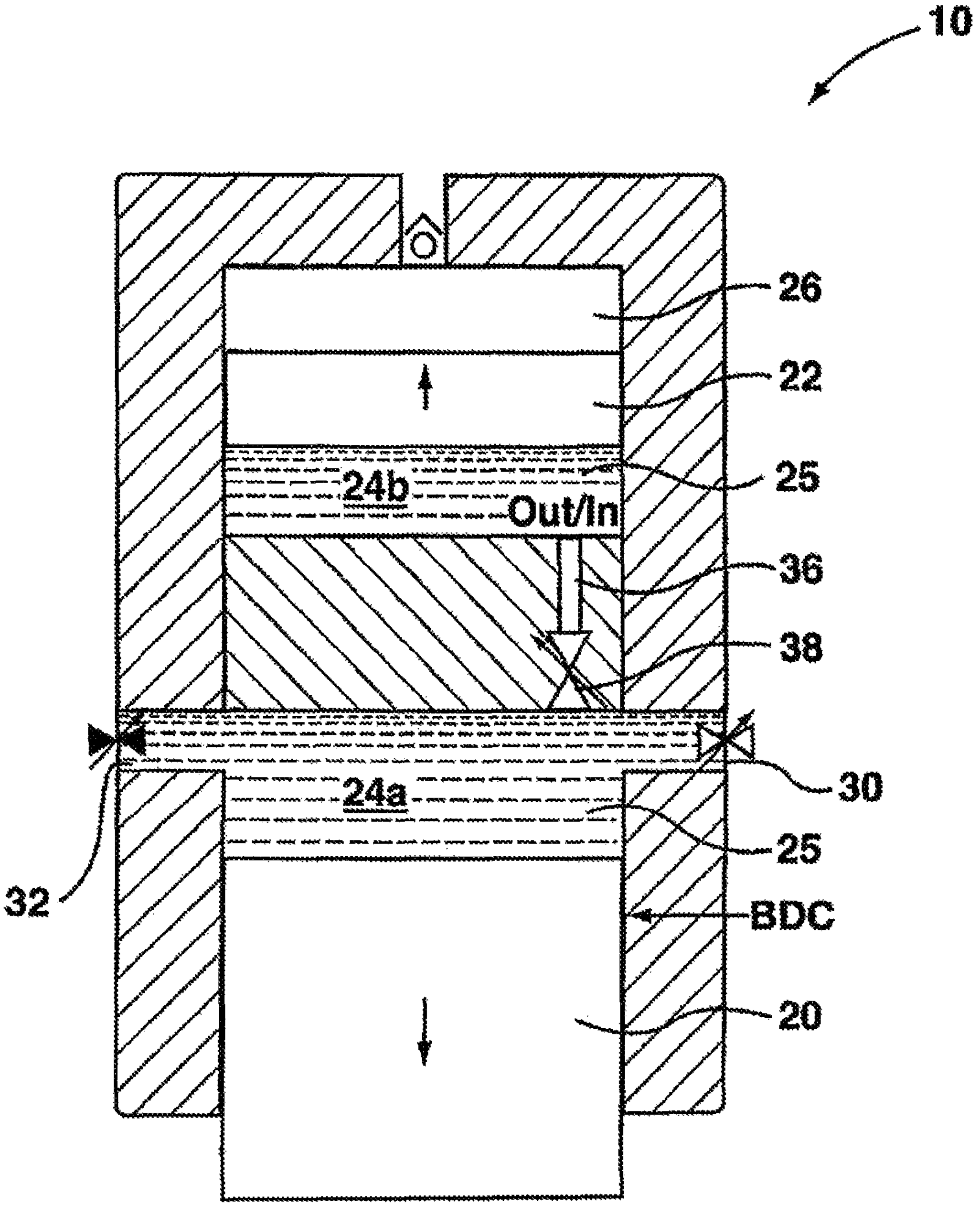
FIG. 4 is an alternative embodiment of the hydraulic device of FIG. 1.
Figure 5:
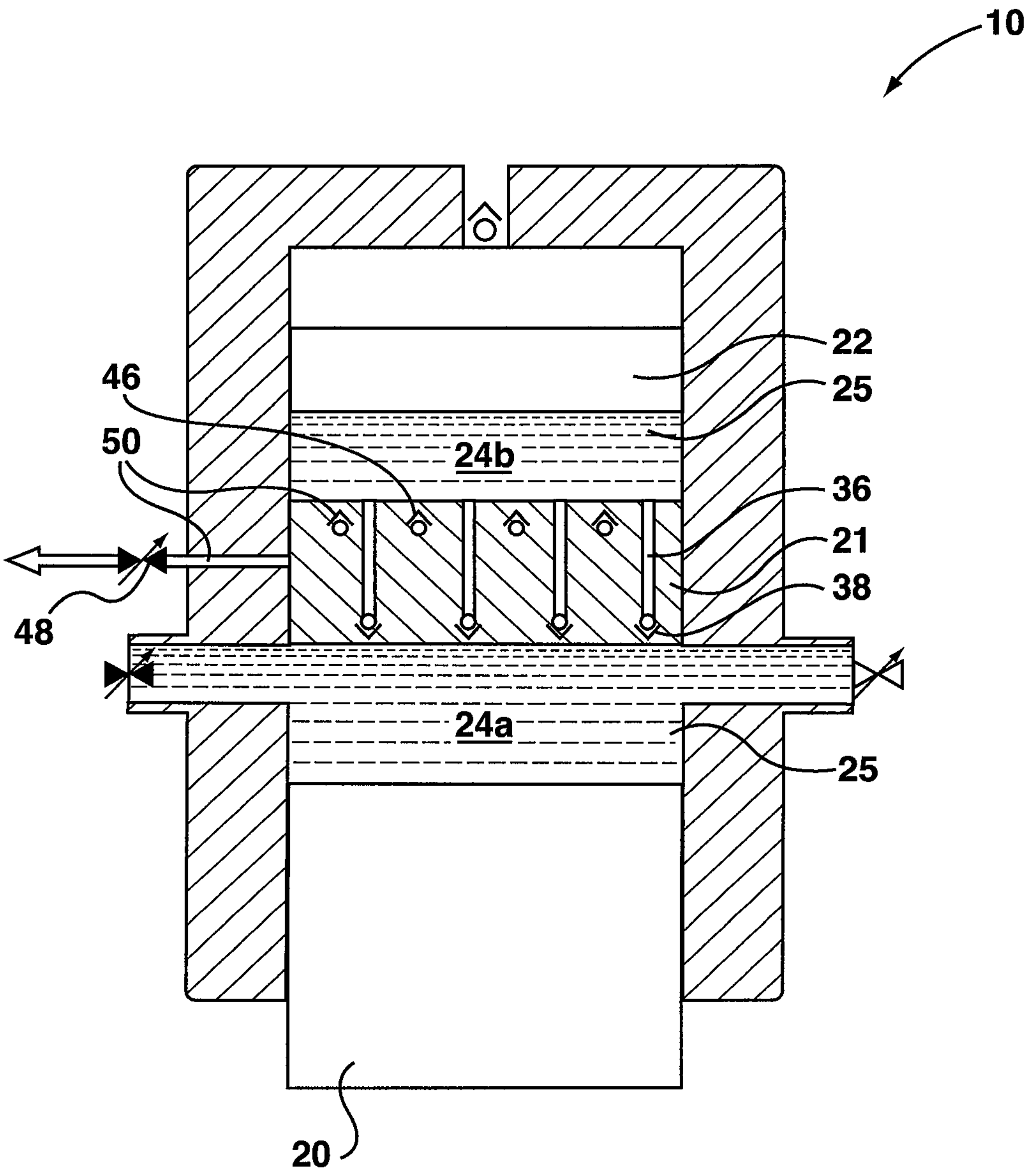
FIG. 5 is an alternative embodiment of the hydraulic device of FIG. 1.

In a further alternative embodiment, as shown in FIG. 4, both the ingress and egress of the hydraulic fluid 25 with respect to the second hydraulic chamber 24*b* can be through fluid passageway 36 as controlled via control valve 38. In this example, the expulsion of hydraulic fluid 25 out of hydraulic chamber 24*b* and out of hydraulic chamber 24*a* are both via hydraulic fluid outlet 32. Referring to FIG. 5, shown is a further alternative embodiment such that there can be multiple fluid passageways 36 and/or multiple fluid passageways 50 in the separator partition 21, as desired.

It is recognised that flow of the hydraulic fluid 25 in each of the passageways 36,50 can be controlled via respective control valves 38,48, as desired. For example, the control valves 38,48 can be valves such as but not limited to check valves, an electrically actuated valve, a spool valve, etc.

Figure 6:
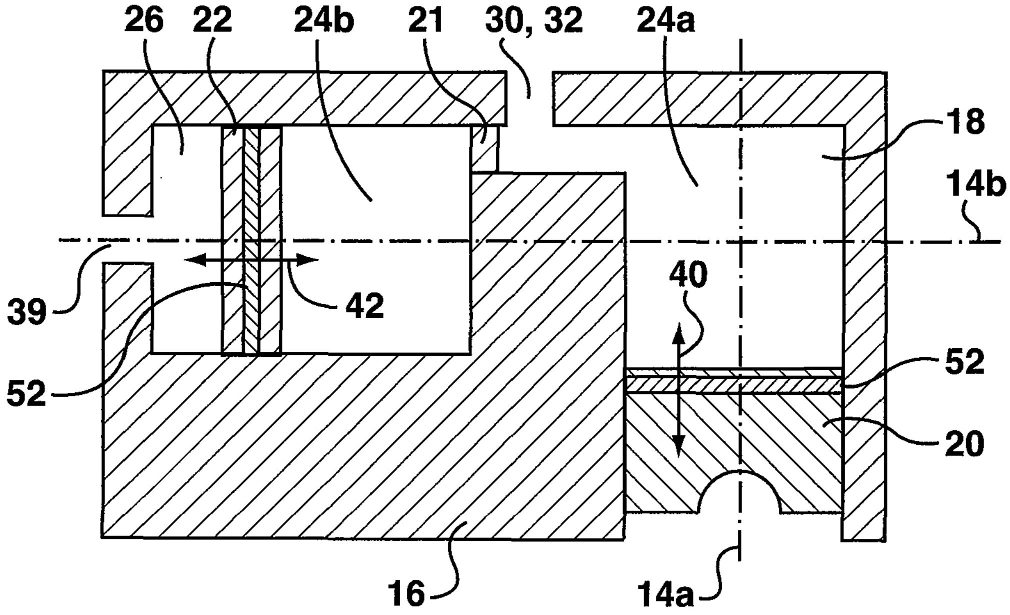
FIG. 6 is an alternative embodiment of the hydraulic device of FIG. 1.
Figure 7:
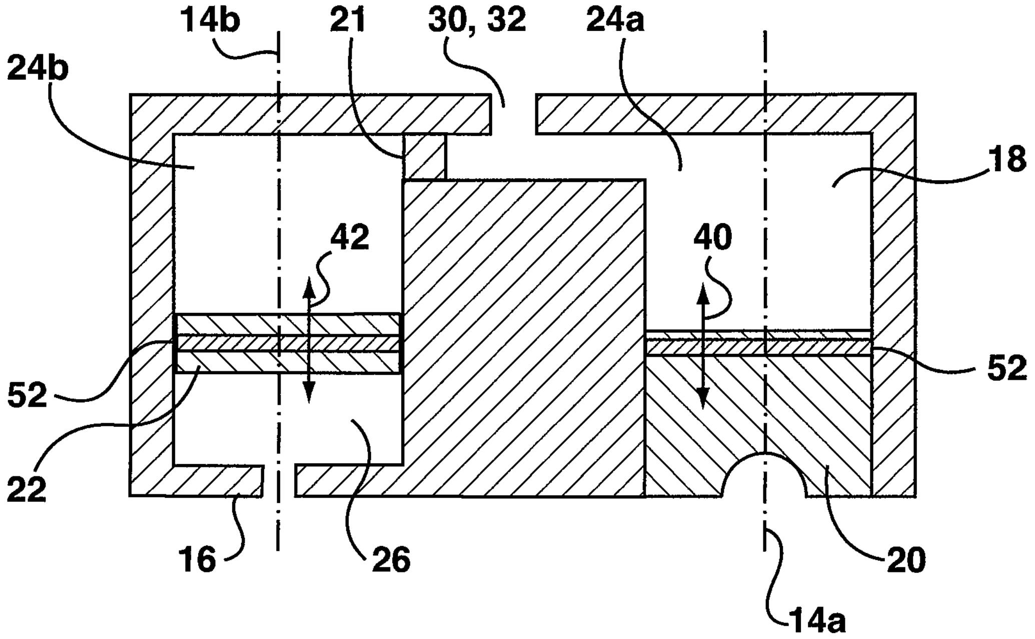
FIG. 7 is an alternative embodiment of the hydraulic device of FIG. 1.

Referring to FIG. 1, shown is a linear configuration of the bore 18 with respect to the pistons 20,22 and their respective reciprocal motions 40,42. Referring to FIGS. 6 and 7, shown are bore 18 embodiments such that the bore axis 14 is divided into a first axis portion 14*a* for the first reciprocal motion 40 and a second axis portion 14*b* for the second reciprocal motion 42. In FIG. 6 the first axis portion 14*a* and the second axis portion 14*b* are at an (e.g. acute) angle with respect to one another. In FIG. 7, the first axis portion 14*a* and the second axis portion 14*b* are separate and offset (e.g. parallel) to one another. As such, FIG. 7 shows the alternative embodiment of the hydraulic device 10 with first and second pistons 20, 22 in a side by side configuration. The hydraulic device 10 includes the central bore 18 that is operable to receive the first piston 20 and the second piston 22, both of which are operable to reciprocate within the central bore 18 (e.g. bore 18 for the chamber 24*a* and bore 18 of the chamber 24*b*). The central bore is U-shaped and includes several turns within it. Each of the first and second pistons 20, 22 are operable to reciprocate within the bore 18 along their axis 14*a,b*. First piston 20 reciprocates within central bore 18 along axis 14*a* and second piston 22 reciprocates within central bore 18 along axis 14*b*. As can be seen in FIG. 7, axis 14*a* can be offset from axis 14*b*.

Turning to FIG. 6 the alternative embodiment of the hydraulic device 10 is shown with the hydraulic device 10 including the housing 16 having a central bore 18. In this embodiment the pistons 20, 22 are operating at an (e.g. 90°) angle to each other. The operation of the hydraulic device 10 is still, as per the above description. As can be seen in FIG. 6, first piston 20 reciprocates within central bore 18 along axis 14*a* and second piston 22 reciprocates within central bore 18 along axis 14*b*. Axis 14*a* and axis 14*b* are in a non-parallel configuration, and in fact can be located at 90° relative to each other.

Each of the first piston 20 and the second piston 22 can also include a piston seal, indicated generally in FIGS. 6 and 7 at numeral 52. The piston seal 52 is operable to trap gas/hydraulic fluid within the respective chambers 26,24 and to inhibit bleed through into the other of the chambers 26,24 or out of the chambers 26,24, as desired. For example, the piston seal 52 inhibits the mixing of the fluid 25 with the resilient element 27 (e.g. compressible gas) in either of the chambers 24*b*, 26 (e.g. hydraulic fluid 25 into chamber 26 and/or compressible gas 27 into chamber 24*b*, 24*a*). As well, the seal 52 can inhibit leakage of the hydraulic fluid 25 out of the chamber 24*a* and into a crankcase (not shown) containing the mechanical element 19.

Figure 8:
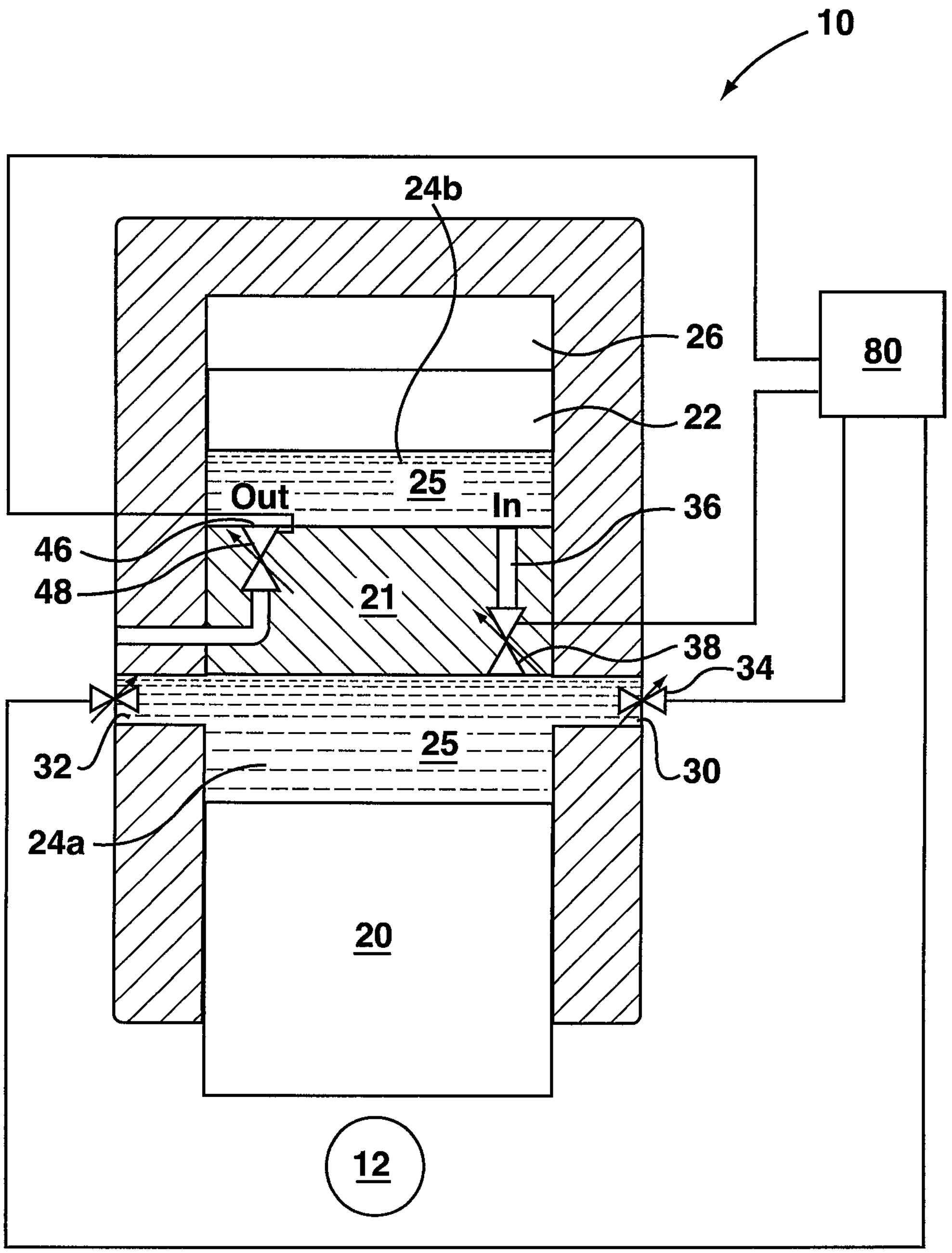
FIG. 8 is an example control system of the device of FIG. 1.

Referring to FIG. 8, a control unit 80 can be programmed (e.g. a computer having a set of stored instructions executable by a computer processor) to operate the valves 34, 38, 48 in a predefined order, so as to effect operation of the device 10 as a hydraulic pump or as a hydraulic motor. Further, the injection of hydraulic fluid 25 with respect to the chambers 24*a,b* can be performed simultaneously or the injection of the hydraulic fluid 25 can be restricted to one of the chambers 24*a,b* as facilitated by opening and closing of selected valves 34,38,48. Further, the ejection of hydraulic fluid 25 with respect to the chambers 24*a,b* can be performed simultaneously or the ejection of the hydraulic fluid 25 can be restricted from only one of the chambers 24*a,b* at a time, as facilitated by the opening and closing of selected valves 34,38,48. Pump mode operation is where the mechanical element 12 drives the piston 20, while motor mode is where the mechanical element 12 is driven by the piston 20.

Figure 9:
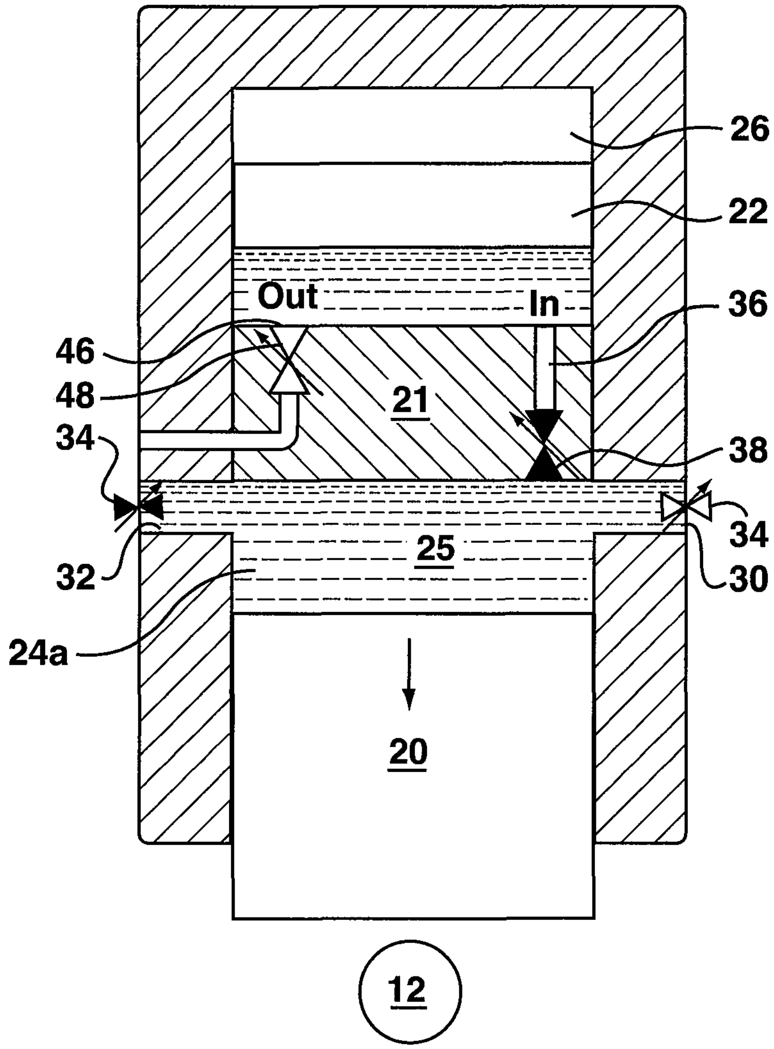
FIG. 9 is an example operation using the control system of FIG. 8.

For example, referring to FIG. 9, valve 34 of the fluid inlet 30 can be opened and valve 34 of the fluid outlet 32 can be closed to allow for the entry of the hydraulic fluid 25 into the chamber 24*a* to fill chamber 24*a*, while restricting entry of the hydraulic fluid 25 into the chamber 24*b* via passageway 36 by keeping valve 38 closed at the same time. In this manner of valve 34,38 operation, chamber 24*a* experiences hydraulic fluid 25 filling (e.g. either by draw action of piston 20 due to pump mode operation or by injection of pressurized hydraulic fluid 25 forcing piston 20 downwards due to motor operation, both modes having the piston 20 moving away from the partition 21), while at the same time filling of chamber 24*b* by the hydraulic fluid 25 is restricted. In effect, the device 10 operates as if the chamber 24*b* and the floating piston 22 are isolated from influence by/of the hydraulic fluid 25 in the chamber 24*a* in either pump mode or motor mode of the hydraulic device 10.

Figure 10:
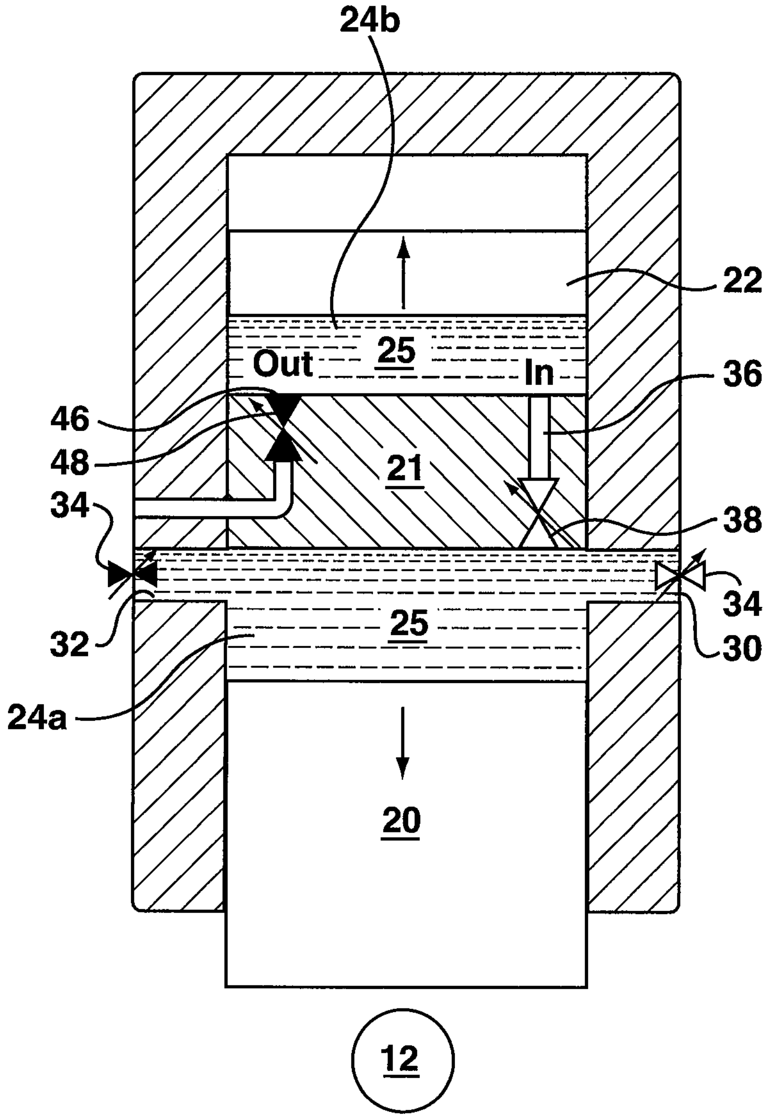
FIG. 10 is a further example operation using the control system of FIG. 8.

For example, referring to FIG. 10, valve 34 of the fluid inlet 30 can be opened and valve 34 of the fluid outlet 32 can be closed to allow for presence of the hydraulic fluid 25 in chamber 24*a*, while also allowing entry of the hydraulic fluid 25 into the chamber 24*b* via passageway 36 by keeping valve 38 open. In this manner of valve 34,38 operation, chamber 24*a* experiences hydraulic fluid 25 presence (e.g. injection of pressurized hydraulic fluid 25 forcing piston 20 downwards away from the partition 21 due to motor operation), thus providing for entry of the hydraulic fluid into the chamber 24*b*. In effect, the device 10 operates as if the chamber 24*b* and the floating piston 22 are influenced by the hydraulic fluid 25 present in the chamber 24*a* in motor mode of the hydraulic device 10.

Figure 11:
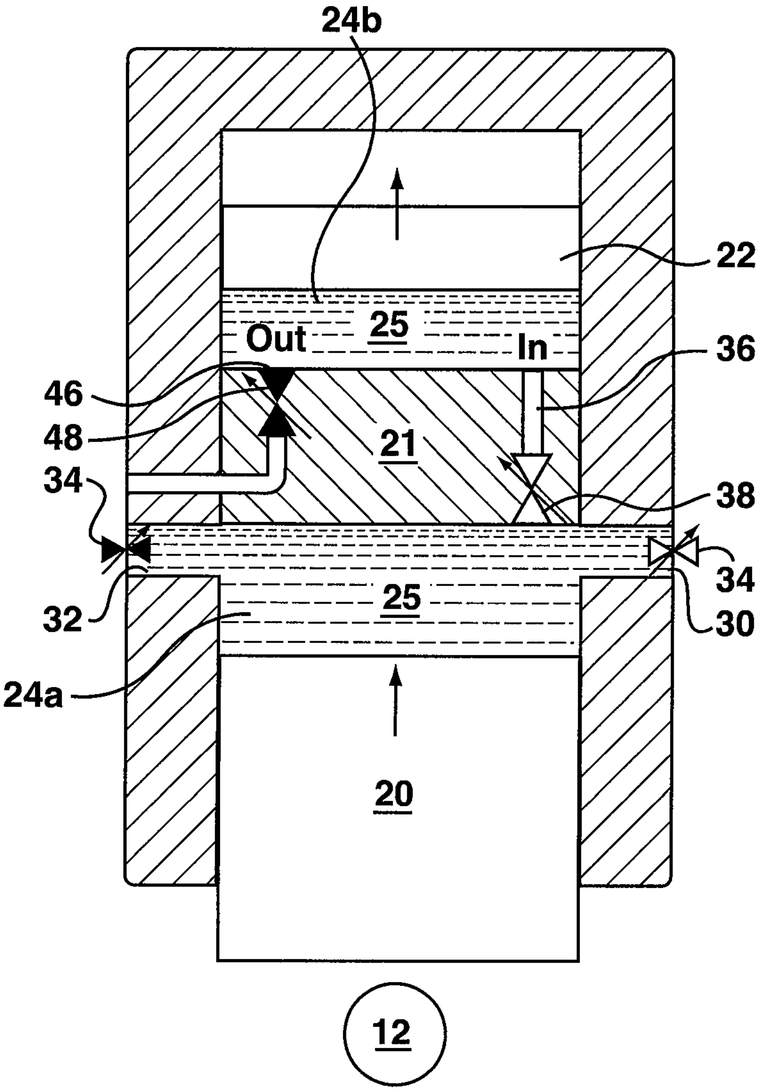
FIG. 11 is a further example operation using the control system of FIG. 8.

For example, referring to FIG. 11, valve 34 of the fluid inlet 30 can be closed and valve 34 of the fluid outlet 32 can be closed to allow for presence of the hydraulic fluid 25 in chamber 24*a*, while also allowing entry of the hydraulic fluid 25 into the chamber 24*b* via passageway 36 by keeping valve 38 open. In this manner of valve 34,38 operation, chamber 24*a* experiences hydraulic fluid 25 presence (e.g. power stroke in pump mode of the device 10 by forcing piston 20 upwards—towards the partition 21 due to being driven by the mechanical element 12), thus providing for entry of the hydraulic fluid 25 into the chamber 24*b*. In effect, the device 10 operates as if the chamber 24*b* and the floating piston 22 are influenced by the hydraulic fluid 25 present in the chamber 24*a* in pump mode of the hydraulic device 10.

Figure 12:
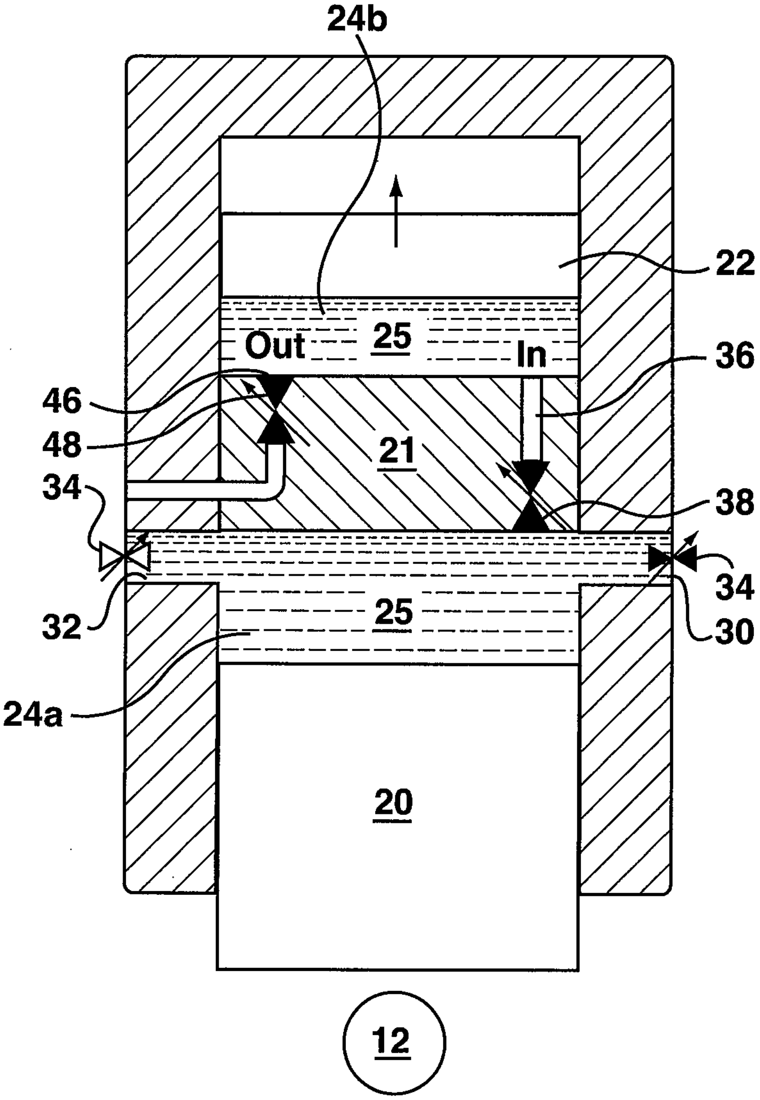
FIG. 12 is a further example operation using the control system of FIG. 8.

Referring to FIG. 12, valve 34 of the fluid inlet 30 can be closed and valve 34 of the fluid outlet 32 can be open to allow for the exit of the hydraulic fluid 25 out of the chamber 24*a*, while restricting exit of the hydraulic fluid 25 out of the chamber 24*b* via outlet 46 by keeping valve 38, 48 closed at the same time. In this manner of valve 34,38,48 operation, chamber 24*a* experiences hydraulic fluid 25 emptying (e.g. by push action of piston 20 moving towards the partition 21), while at the same time chamber 24*b* retains its hydraulic fluid 25 despite effect of biasing the piston 22 towards the partition 21 by the resilient element 27 in chamber 26. In effect, the device 10 operates as if the chamber 24*b* and the floating piston 22 are isolated from influence by/of the hydraulic fluid 25 exiting the chamber 24*a* in either pump mode or motor mode of the hydraulic device 10.

Figure 13:
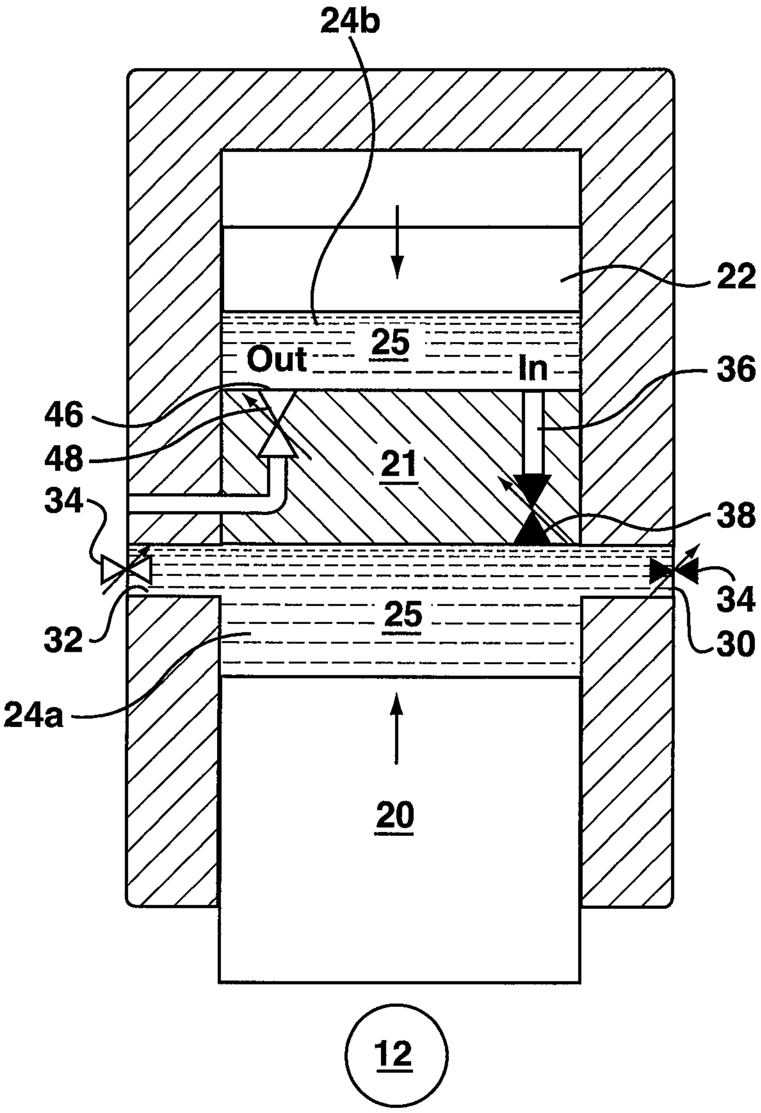
FIG. 13 is a further example operation using the control system of FIG. 8.

Referring to FIG. 13, valve 34 of the fluid inlet 30 can be closed and valve 34 of the fluid outlet 32 can be open to allow for the exit of the hydraulic fluid 25 out of the chamber 24*a*, while allowing exit of the hydraulic fluid 25 out of the chamber 24*b* via outlet 46 by opening valve 48 (e.g. with valve 38 closed) at the same time. In this manner of valve 34,38,48 operation, chamber 24*a* experiences hydraulic fluid 25 emptying (e.g. by push action of piston 20 moving towards the partition 21), while at the same time chamber 24*b* expels its hydraulic fluid 25 by push action of piston 22 moving towards (e.g. under influence of the stored energy of the resilient element 27) the partition 21. In effect, the device 10 operates as if the chamber 24*b* and the floating piston 22 contribute to the hydraulic fluid 25 exiting the combined chamber 24 in either pump mode or motor mode of the hydraulic device 10.

Figure 14:
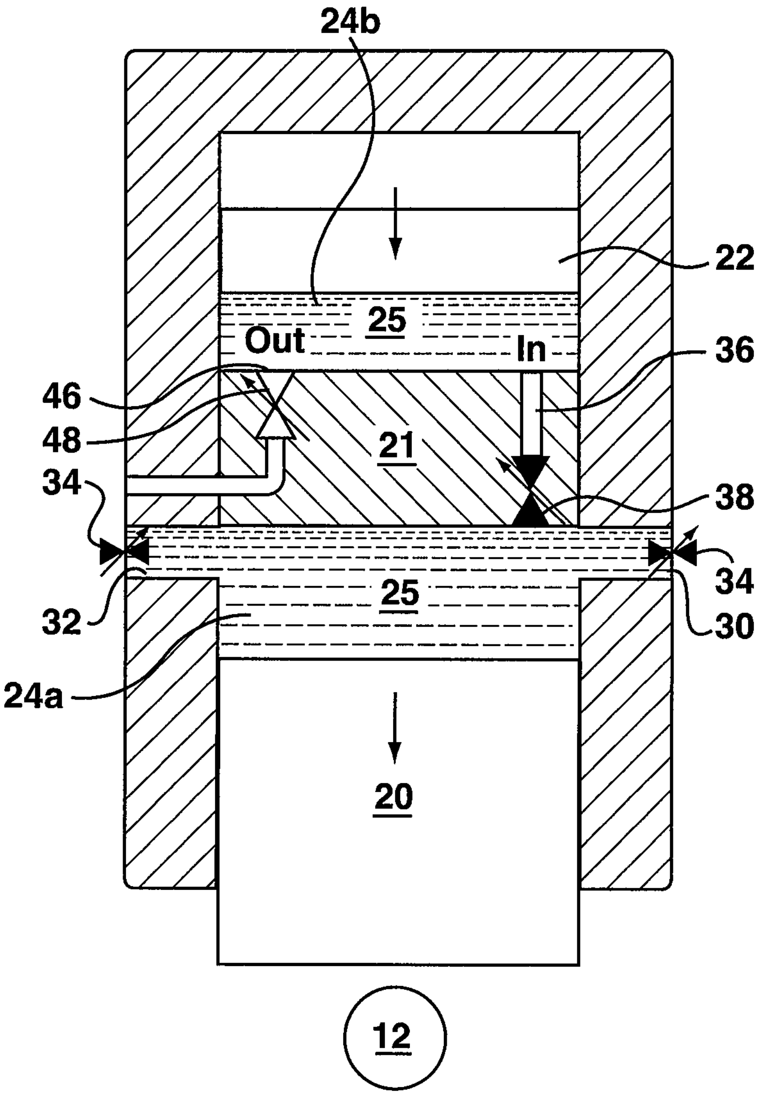
FIG. 14 is a further example operation using the control system of FIG. 8.

Referring to FIG. 14, valve 34 of the fluid inlet 30 can be open and valve 34 of the fluid outlet 32 can be closed to allow for the entry of the hydraulic fluid 25 in to the chamber 24*a*, while allowing exit of the hydraulic fluid 25 out of the chamber 24*b* via outlet 46 by opening valve 48 (e.g. with valve 38 closed) at the same time. In this manner of valve 34,38,48 operation, chamber 24*a* experiences hydraulic fluid 25 entry (e.g. by draw action of piston 20 moving away from the partition 21 or by injection via motor mode), while at the same time chamber 24*b* expels its hydraulic fluid 25 by push action of piston 22 moving towards the partition 21 under effect of the bias provided by the resilient element 27. In effect, the chambers 24*a*,24*b* can be operated independently with respect to entry or exit of their respective hydraulic fluid 25 in their respective chambers 24*a,b*, as desired.

It is also recognised in operation of the valves 34,38,48 via the control unit 80, in view of FIG. 2, that the exit of hydraulic fluid 25 from the chamber 24*b* can pass through the bore 18 wall and not through the partition 21. It is also recognised, in view of FIGS. 3 and 4 that the exit of hydraulic fluid 25 from the chamber 24*b* can pass through the chamber 24*a* before eventually exiting via fluid outlet 32, as desired.

In view of the above operation of the control unit 80 and the respective valves 34,38,48, it is recognised that the pistons 20, 22 can move independently from one another. For example, the piston 20 can move towards the partition 21 (e.g. under influence of the mechanical element 12) while the piston 22 remains stationary (e.g. unmoving due to balance of the hydraulic fluid 25 pressure in chamber 24*b* against the bias of the resilient element 27 of the piston 22 towards the partition 21) with respect to the partition 21. For example, the piston 20 can move away from the partition 21 (e.g. under influence of the mechanical element 12 or under influence of injected hydraulic fluid into the chamber 24*a*) while the piston 22 remains stationary (e.g. unmoving due to balance of the hydraulic fluid 25 pressure in chamber 24*b* against the bias of the resilient element 27 of the piston 22 towards the partition 21) with respect to the partition 21. For example, the piston 20 can move towards the partition 21 (e.g. under influence of the mechanical element 12) while the piston 22 moves away from (e.g. due to unbalance of the hydraulic fluid 25 pressure in chamber 24*b* against the bias of the resilient element 27 of the piston 22) the partition 21. For example, the piston 20 can move towards the partition 21 (e.g. under influence of the mechanical element 12) while the piston 22 moves (e.g. due to unbalance of the hydraulic fluid 25 pressure in chamber 24*b* against the bias of the resilient element 27 of the piston 22) towards to the partition 21. For example, the piston 20 can remain stationary with respect to the partition 21 while the piston 22 moves towards (e.g. moving due to unbalance of the hydraulic fluid 25 pressure in chamber 24*b* against the bias of the resilient element 27 of the piston 22 towards the partition 21) the partition 21. For example, the piston 20 can remain stationary with respect to the partition 21 while the piston 22 moves away from (e.g. moving due to unbalance of the hydraulic fluid 25 pressure in chamber 24*b* against the bias of the resilient element 27 of the piston 22 towards the partition 21) the partition 21. In many of the above cases, it is recognised that the movement of the piston 20 can result in either an ingress or egress of hydraulic fluid 25 with respect to the chamber 24*a* based on how the valves 34,38,48 are open/closed. In many of the above cases, it is recognised that the movement of the piston 22 can result in either an ingress or egress of hydraulic fluid 25 with respect to the chamber 24*b* based on how the valves 34,38,48 are open/closed.

While this invention has been described with reference to illustrative embodiments and examples, the description is not intended to be construed in a limiting sense. Thus, various modification of the illustrative embodiments, as well as other embodiments of the invention, will be apparent to persons skilled in the art upon reference to this description. It is therefore contemplated that the appended claims will cover any such modifications or embodiments. Further, all of the claims are hereby incorporated by reference into the description of the preferred embodiments.

Any publications, patents and patent applications referred to herein are incorporated by reference in their entirety to the same extent as if each individual publication, patent or patent application was specifically and individually indicated to be incorporated by reference in its entirety.

The invention claimed is:

1. A hydraulic device having:

a housing;

a bore of the housing having a first piston positioned therein for a first reciprocal motion within the bore along a bore axis;

a mechanical element coupled to the first piston for either driving the first reciprocal motion or being driven by the first reciprocal motion;

a second piston positioned in the bore for a second reciprocal motion within the bore along the bore axis;

a hydraulic fluid chamber of the bore positioned between the first piston and the second piston, the hydraulic fluid chamber having a hydraulic fluid inlet and a hydraulic fluid outlet;

a chamber of the bore positioned between the second piston and a wall of the housing, the chamber for having a resilient element therein;

a separator partition dividing the hydraulic fluid chamber into a first hydraulic fluid chamber and a second hydraulic fluid chamber, the separator partition positioned in the bore between the hydraulic fluid inlet and the second piston, the separator partition having a first fluid passageway for fluidly coupling the first hydraulic fluid chamber with the second hydraulic fluid chamber; and a valve for controlling flow in the first fluid passageway of hydraulic fluid between the first hydraulic fluid chamber and the second hydraulic fluid chamber.

2. The hydraulic device of claim 1, wherein the resilient element is a compressible fluid.

3. The hydraulic device of claim 2 further comprising a passageway in the wall of the housing for controlling an amount of the compressible fluid in the chamber.

4. The hydraulic device of claim 1, wherein the hydraulic fluid outlet is between the separator partition and the first piston.

5. The hydraulic device of claim 1 further comprising a second hydraulic fluid outlet for exhausting hydraulic fluid out of the second hydraulic chamber, the second hydraulic fluid outlet being separate from the first hydraulic fluid outlet.

6. The hydraulic device of claim 5, wherein the second hydraulic fluid outlet is a second fluid passageway in the separator partition.

7. The hydraulic device of claim 6, wherein the second fluid passageway provides for the exhausting of the hydraulic fluid from the second hydraulic fluid chamber and out of the bore.

8. The hydraulic device of claim 6, wherein the second fluid passageway provides for the exhausting of the hydraulic fluid from the second hydraulic fluid chamber and into the first hydraulic fluid chamber.

9. The hydraulic device of claim 7, wherein the second fluid passageway provides for the exhausting of the hydraulic fluid from the second hydraulic fluid chamber and into the first hydraulic fluid chamber.

10. The hydraulic device of claim 1, wherein the bore axis is linear.

11. The hydraulic device of claim 1, wherein the bore axis is divided into a first axis portion for the first reciprocal motion and a second axis portion for the second reciprocal motion, such that the first axis portion and the second axis portion are at an acute angle with respect to one another.

12. The hydraulic device of claim 1, wherein the valve is selected from the group consisting of a check valve and an electrically actuated valve.

13. The hydraulic device of claim 1, wherein the hydraulic fluid inlet and the hydraulic fluid outlet are controlled via respective actuated valves.

14. The hydraulic device of claim 5, wherein the second fluid passageway is controlled by a second valve.

15. The hydraulic device of claim 1 further comprising a plurality of the first fluid passageway in the separator partition.

16. The hydraulic device of claim 15, wherein each of the fluid passageways of the plurality of first fluid passageways are controlled by a respective valve.

17. The hydraulic device of claim 16, wherein the respective valve is selected from the group consisting of a check valve and an electrically actuated valve.

18. The hydraulic device of claim 8, wherein the second fluid passageway is controlled by a multi-way valve for selecting the exhausting of the hydraulic fluid out of the second hydraulic chamber by either out of the bore or into the first hydraulic chamber.

19. The hydraulic device of claim 6 further comprising the second valve configured to open simultaneously with the valve when exhausting the hydraulic fluid out of the hydraulic chamber.

20. The hydraulic device of claim 1, wherein the first reciprocal motion and the second reciprocal motion are configured for acting in both a same direction and an opposite direction along the bore axis during respective portions of an intake and exhaust cycle of the hydraulic device.

21. The hydraulic device of claim 1, wherein the mechanical element is selected from the group consisting of a cam surface in contact with the first piston and a connect rod connected to the first piston.

* * * * *